Patented Apr. 12, 1932

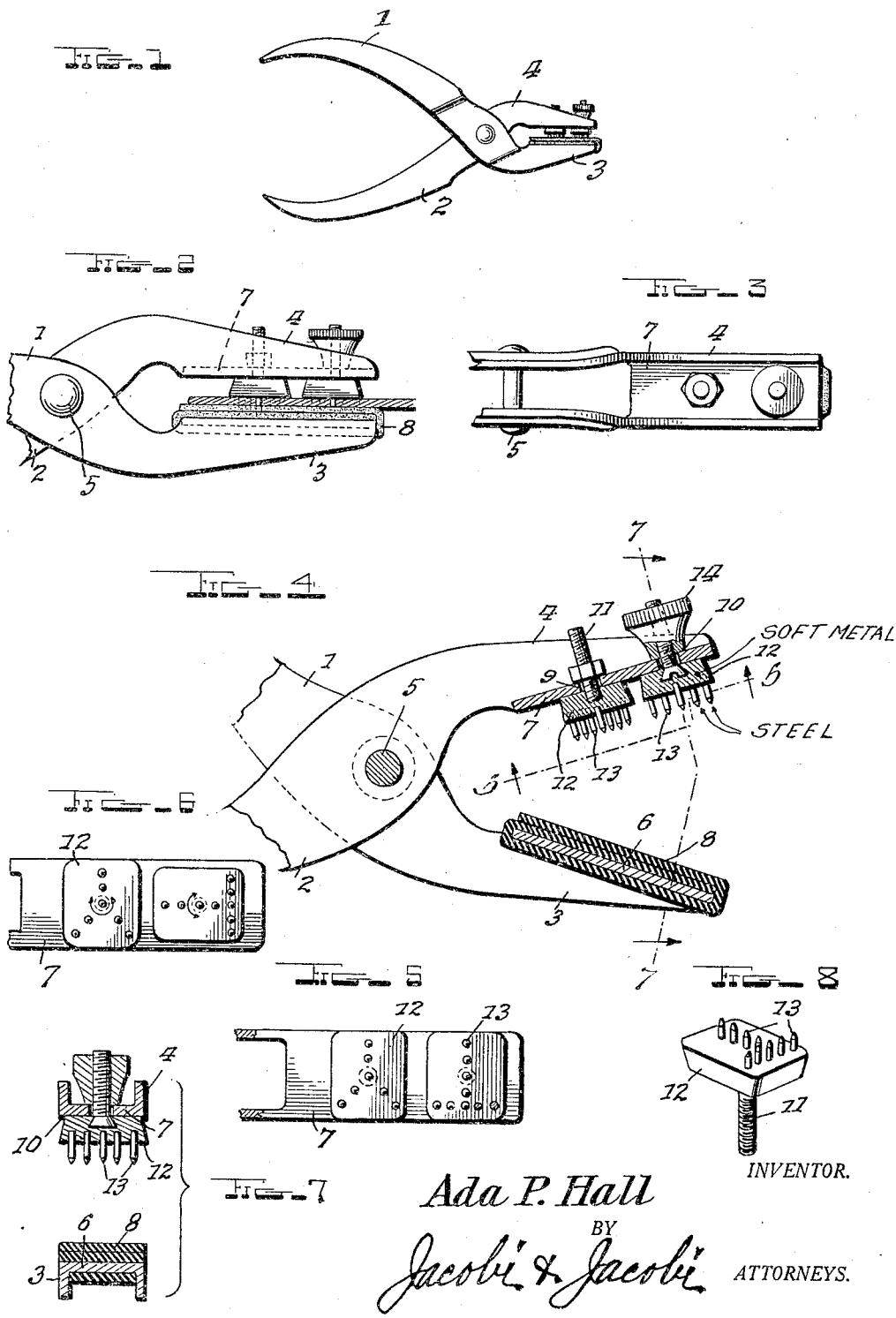

1,853,416

UNITED STATES PATENT OFFICE

ADA P. HALL, OF HALLSVILLE, ILLINOIS

TATTOO MARKER

Application filed January 24, 1931. Serial No. 511,013.

This invention relates to new and useful improvements in identification devices and more particularly to a poultry marker, the primary object of the invention being to provide a device of the character mentioned whereby poultry may be tattooed with the identification mark of the owner which will enable the property to be identified in court, should said property be stolen.

A further object of the invention resides in providing a marker of the class described which will enable the identification means to be permanently applied to the poultry or animal to be tattooed, without injury to the bird or animal and without blemish to the flesh.

A further object of the invention resides in providing a marker with elements which are capable of adjustment to various positions to provide means for marking which will permanently identify the owner of the property marked.

Still another object of the invention resides in providing a device which is simple and durable in construction, inexpensive to manufacture and one which will prove efficient and useful in practice.

With these and numerous other objects in view, my invention consists in the novel features of construction, combination and arrangement of parts as will be hereinafter referred to and more particularly pointed out in the specification and claims.

In the accompanying drawings forming a part of this application:

Figure 1 is an elevation of my improved marker;

Figure 2 is an enlarged fragmentary side elevation, with parts in section;

Figure 3 is a fragmentary plan view of one of the jaws;

Figure 4 is an enlarged side elevation with the jaws in outspread position;

Figure 5 is a section as seen on the line 5—5 of Figure 4;

Figure 6 is a view similar to Figure 5, with the marking devices changed from the position shown in Figure 5;

Figure 7 is a vertical transverse section as seen on the line 7—7 of Figure 4; and Figure 8 is a perspective view of one of the marking elements removed.

In describing the invention, I shall refer to the drawings in which similar reference characters designate corresponding parts throughout the several views and in which 1 and 2 represent handle members which continue on and have their outer ends bent to form respectively the jaws 3 and 4. The handle member 1 at portions adjoining the jaw 3 is slotted to receive therethrough the handle member 2, the elements 1 and 2 being pivotally connected together by means of the pintle 5. The jaw members 3 and 4 are respectively provided with flat faces 6 and 7 which may be welded, molded or otherwise secured to the jaws, the face 6 being covered with a rubber strip 8 which is wrapped therearound, as clearly shown in Figure 4 of the drawings. The face 7 is provided with a pair of openings 9 and 10 which are adapted to receive loosely therethrough the threaded stems 11 projecting from the base plates 12 within which said stems are molded. These plates 12 form marking plates, the same being formed of soft metal within which are also molded to project therefrom the steel studs or tattoo elements 13. These studs 13 may be arranged in any fashion whatsoever, preferably designed in the form of letters, although any other symbols may be used as desired.

The plates 12 are of such size as to fit properly within the space covered by the face 7 of the jaw 4 and nuts 14 are adapted to engage with the threaded stems 11 to secure the plates in position. The plates are of such size, however, and the spaces between the openings 9 and 10 being such as to permit the plates 12 to be arranged transversely of the face 7 or longitudinally thereof as shown in Figures 5 and 6 of the drawings. A rearrangement of the plates may be made as the owner of the marker desires.

The lettering on the plates 12 formed by the steel studs 13 is preferably that representing the first letters of the name of the owner but, as stated, any other lettering or any other marking symbols may be used, as desired. For certain purposes, the owner may desire the letters to appear in the manner disclosed in Figure 5 so that when the tattoo is made upon the bird or animal, the letters will appear in upright position. In other instances, the lettering may be adjusted to give a distinctive appearance so that absolute identification may be made. One such distinctive change is disclosed in Figure 6 of the drawings. Other arrangements may be made as are found desirable or necessary. The plates 12 may be readily removed as desired and new plates applied to use. One owner may have any number of plates for marking purposes or may use one set of plates for all animals and all birds owned by him and upon which such tattooing is desired. An important feature of the invention, obviously, is the adjustability of the markers as well as the removability thereof.

When the marking elements are pressed against the opposite jaw, same will be received against the soft face, since the jaw opposite to that containing the marker is covered by a rubber strip, as previously described.

Thieving is prevalent wherever poultry and livestock are grown to any appreciable extent. A permanent identification of one's property is most necessary. Poultry may be tattooed with this device on the webs between the wing and the body and will make a permanent identification. This method of tattooing poultry or livestock produces an irremovable mark without injury to the bird or animal and without blemish to the flesh. Whereas other methods and means of marking have been known, it is a well known fact that tattooing is the most permanent and satisfactory method of identification, although some objection is raised thereto by some owners of poultry and livestock because of the possibility of injury to the bird or animal. However, with a simple device of the character herein disclosed, small initials or other symbols may be applied to the bird or animal for permanent identification which will not injure the bird or animal and which will enable the owner to readily identify his property should occasion require.

From the foregoing description of my improved marking device, the operation thereof and the method of applying the same to use will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction, may be resorted to without departing from the spirit of the invention or sacrificing any of the principles of the invention.

What I claim is:

1. In a poultry and animal marker, a pair of jaw members, one being movable towards and away from the other, a marking element comprising a soft metal plate and hard metal projections carried thereon and means for securing said plate to one of said jaw members, and a strip of elastic material wrapped about the other jaw member for engagement by the metal projections when the jaws are moved towards each other.

2. In a poultry and animal marker, a pair of pivoted jaw members, a marking element for one of said jaw members comprising soft metal plate and hard metal projections embedded therein and projecting from one of the faces thereof, a stem extending from said plate and passed through said jaw member, said stem being rotatable in the jaw member whereby the marker may be turned to adjusted positions, and a fastener carried by said stem to releasably hold the metal plate against the jaw member in an adjusted position.

3. In a poultry and animal marker, a pair of jaw members, one being movable towards and away from the other, one of said jaw members having openings therein, marking elements comprising plates provided with projections, threaded stems carried on said plates projecting through the openings of said jaw member, said plates being adapted for varied adjustment with respect to one another and means engaged with said threaded stems for securing said marking plates in various adjusted positions.

4. In a marker of the class described, a pair of jaw members, one being movable towards and away from the other, one of said jaw members having spaced openings therein, a pair of marking elements therefor comprising soft metal plates and hard metal projections thereon, threaded stems carried by said plates on the face opposed to that having the projections thereon, said stems being loosely projected through the openings in said jaw member and said plates being adapted for varied adjustment with respect to one another, means for securely retaining said plates in various adjusted positions on said jaw member, and a resilient means applied to the other of said jaw members.

In testimony whereof I affix my signature.

ADA P. HALL.